Patented Nov. 24, 1931

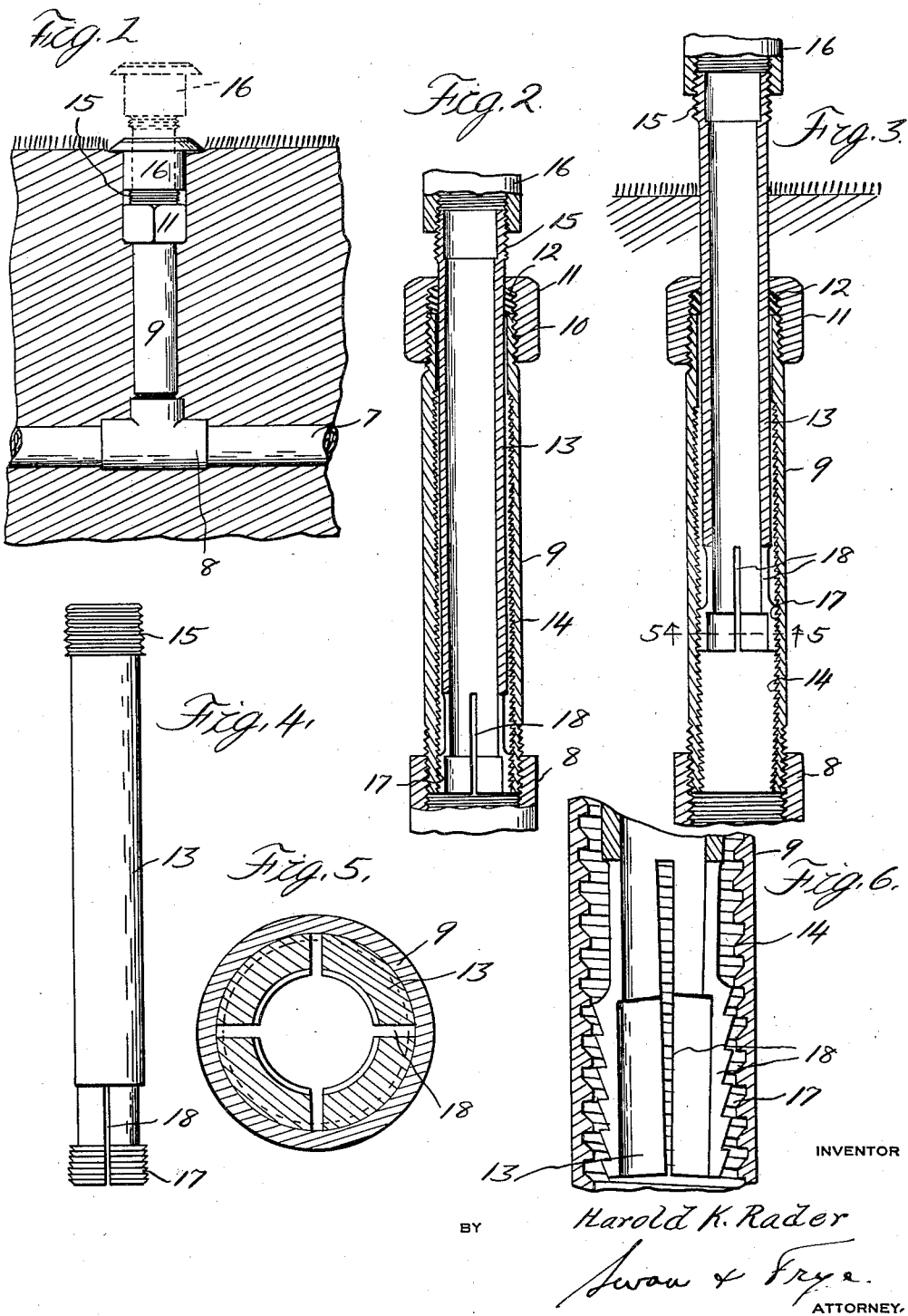

1,833,040

UNITED STATES PATENT OFFICE

HAROLD K. RADER, OF PORT HURON, MICHIGAN, ASSIGNOR TO MUELLER BRASS CO., OF PORT HURON, MICHIGAN, A CORPORATION OF MICHIGAN

ADJUSTABLE EXTENSION FOR SPRINKLER SYSTEMS

Application filed September 23, 1929. Serial No. 394,711.

This invention relates to readily adjustable extensions for plumbing fixtures and the like, and more particularly to means for readily securing the adjustment of underground sprinklers in lawn sprinkling systems whereby the sprinkler head proper may be maintained flush with the top of the lawn.

One of the objects of the present invention is the provision of a simple and efficient means for readily securing desired adjustments between a source of water supply and an extension whereon a sprinkler head or other desired fixture may be removably secured.

Another object of this invention is the arrangement in a lawn sprinkler system of adjustable extensions between the underground water supply pipe and the fixtures flush with or above the ground, whereby in the event that a lawn mower, roller, or other implement contacts with such fixture, neither the sprinkler system nor the implement will be damaged.

A further object of this invention is the provision of an adjustable extension in hydraulic supply systems wherein an inner member may readily telescope within an outer member in one direction of its movement, but can only be moved in the opposite direction by proper rotation of the inner member regardless of the hydraulic pressure to which the extension is subjected.

Other objects and advantages will be apparent from the following description, wherein reference is made to the accompanying drawings illustrating a preferred embodiment of my invention and wherein similar reference numerals designate similar parts throughout the several views.

In the drawings:—

Figure 1 is a detail elevation of my improved adjustable extension connected with the underground water supply pipe of a lawn sprinkler system, the extension being shown in full lines in its desired position and a portion thereof in dotted lines in an intermediate position.

Figure 2 is a longitudinal central sectional view through my improved adjustable extension.

Figure 3 is a similar view with the inner telescoping member in a different position.

Figure 4 is a detail elevation of the inner extension member.

Figure 5 is an enlarged cross sectional view taken substantially on the line 5—5 of Figure 3, and Figure 6 is an enlarged vertical sectional view showing the action of a lower portion of the inner extension while it is being moved downwardly without rotation.

Referring now to the drawings the numeral 7 designates a water supply pipe which may be embedded in the ground, as in lawn sprinkler systems, or placed in any other desired position. One or more conventional T-couplings 8 are arranged in the supply pipe 7 wherever desired, and in the lateral arm of the coupling is arranged an outer extension member 9, as by threading the lower extremity of the outer member 9 into the coupling 8 in the usual manner. The upper extremity of the outer member 9 is also provided with pipe threads 10 to receive a packing nut 11 whereby suitable packing 12 may be compressed by proper rotation of the nut 11 to prevent leakage of water or the like between the upper end of the outer member 9 and an inner member 13 adjustably mounted within such outer member. The outer member 9 is internally threaded throughout the major portion of its length with a buttress thread 14, the thread as herein shown extending from the lower extremity of the member 9 to almost the upper extremity thereof. The inner member 13 is best shown in Figure 4 and comprises a pipe or other cylindrical member of lesser diameter than the bore of the outer member 9 so that the body portion of the inner member may move within the outer member 9 without contacting the threads 14 thereof, but will be engaged by the packing 12 when the packing nut 11 is suitably turned down. The upper extremity of the inner member 13 is provided with external pipe threads 15 for mounting a sprinkler head 16, or other desired fitting, directly upon the inner member 13. This permits the movement of the sprinkler head or other fixture directly with the inner extension member.

The lower portion of the inner extension member 13 is provided with external buttress threads 17 of suitable diameter to mesh with the internal buttress 14 in the outer extension member 9, when the inner member 13 is positioned within the outer extension member, and such threaded portion is arranged to spring inwardly when subjected to sufficient pressure to enable the movement of the threads 17 out of engagement with the threads 14 of the outer extension member. As herein shown, I accomplish this by slotting the lower extremity of the inner member 13 with a plurality of longitudinal slots 18 to enable the inward movement of the portions between the slots, and also reduce the thickness of the body portion of the inner member 13 directly above the threaded lower portion to enable readier flexing of the portions between the slots 18 from above the threaded lower extremity of the inner member. By virtue of this construction I am enabled to readily move the inner extension member 13 within the outer extension member 9 in the direction from the packing nut toward the coupling 8 without rotating the inner extension member, since the buttress threads 17 on the lower extremity of the inner member 13 will ride upon the inclined upper surface of the buttress threads 14 of the outer extension member and spring inwardly sufficiently to clear such threads during such downward movement, but reverse movement, i. e., from the coupling 8 toward the packing nut 11, cannot be secured without rotating the inner extension member 13, since the flattened surfaces of the buttress threads 14 and 17 would then be in engagement with each other to resist a direct upward movement and the resiliency of the threaded portions of the inner member 13 would tend to hold them into snug engagement with the outer member 9. However, proper rotation of the inner member will slowly raise the inner member relatively to the outer member 9 to secure any desired height for the outer end of the inner member.

In using my improved adjustable extension in lawn sprinkler systems, for example, I preferably fix the outer extension members 9 in T-couplings 8 wherever desired, mount the inner extension members 13 therein in positions above those desired in actual use, and then tighten the packing nuts 11 to press the packings 12 against the peripheries of the inner members. The sprinkler heads, or other desired fixtures, may or may not be previously attached to the outer extremities of the inner members 13, but if so attached, the position of the inner member and sprinkler head would be substantially as shown in dotted lines in Figure 1. The earth may then be packed around the water supply pipe 7 and the outer extension members and the installation of the sprinkler system completed with the heads 16 protruding above the ground. Then when it is desired to properly locate the sprinkler heads it is only necessary to step upon each sprinkler head and press it and the attached inner extension member 13 downwardly until the head is substantially flush with the ground, or a roller or the like may be rolled directly over the protruding heads to force them to the desired positions substantially flush with the ground. It is immaterial with this arrangement whether or not the ground is level, for the distance between the water supply pipe 7 and the top of the ground may vary considerably without affecting the ready installation of the extension members and the final positioning of the sprinkler heads flush with the surface of the ground. Moreover, further contacts of implements like lawn mowers or rollers with the sprinkler heads will not change the position of the extension members nor damage the implements themselves. Should it be desired to raise any sprinkler head it is only necessary to rotate the sprinkler head and its attached inner extension member in the proper direction and the inner extension member will gradually be moved outwardly from the outer member 9 due to the interengaging buttress threads 14 and 17.

The simplicity and practicability of my improved adjustable extension member is believed to be apparent. Much time and labor may be saved in installing lawn sprinkler systems and the like, while the desired flush relation of the sprinkler heads with the ground can readily be secured after the ditches containing the supply pipes 7 have been filled up. Moreover, the system is almost completely protected from external injury, while changes in the water pressure would not serve to force the sprinkler heads or the inner extension members above their desired positions, because the inter-engaging buttress threads 14 and 17 would prevent upward movement of such parts, and the higher pressure of the water within the inner extension member would serve to hold the resilient threaded portions at its lower extremity more firmly against the threads 14 of the outer member 9.

It will also be apparent that my improved extension member is adapted for other uses than in lawn sprinkler systems, as for example, in connecting supply pipes to sinks, lavatories, bath-tubs, etc.

While it will be apparent that the illustrated embodiment of my invention herein disclosed is well calculated to adequately fulfill the objects and advantages primarily stated, it is to be understood that the invention is susceptible to variation, modification and change wihin the spirit and scope of the subjoined claims.

I claim:

1. An adjustable extension for plumbing fixtures comprising a pair of telescoping members provided with inter-engaging threads, the threads on one of said members being mounted upon a flexible portion thereof whereby under application of force, they will disengage from the threads of the other member for free longitudinal movement in one direction throughout the threaded length of said other member.

2. An adjustable extension for plumbing fixtures, comprising an outer member having an internal thread, a packing gland at one extremity of the outer member, and an inner member snugly fitting within the packing gland and having an externally threaded resilient portion arranged to mesh with the threads of the outer member for movement in one direction, and to automatically disengage from the threads of the outer member for movement in the opposite direction throughout the threaded length of said other member.

3. An adjustable extension for plumbing fixtures, comprising a pair of telescoping members having interengaging buttress threads, one of the members having a flexible portion carrying its threads and arranged whereby pressure upon said member in one direction at any one of a plurality of positions will disengage its threads from the threads of the other member.

4. An adjustable extension for plumbing fixtures, comprising a hollow outer member internally threaded and connected at one extremity with a source of water supply, a packing gland secured upon the opposite extremity of said member, a telescoping inner member arranged to snugly fit within said packing gland, and having a slotted flexible portion adjacent one of its extremities, said flexible portion carrying threads adapted to engage with the internal threads of the outer member for movement by rotation in one direction, and adapted to disengage with internal threads of the outer member for free longitudinal movement in the opposite direction throughout the threaded lengths of said outer member.

5. An adjustable extension for plumbing fixtures comprising a threaded member, a second member telescoping therewith and provided with threads and resilient means adapted to normally force the threads into threading cooperation at any one of a plurality of positions but adapted to permit longitudinal sliding.

6. An adjustable extension for plumbing fixtures comprising an internally threaded member, a second member telescoping therewith and provided with an oppositely, externally threaded portion normally engaging said internal threads, said portion having longitudinal slits therein whereby, at any one of a plurality of positions said threaded portion may move inwardly out of engagement with the internal threads.

7. An adjustable extension for plumbing fixtures comprising an internally threaded member a second member telescoping therewith and provided with external threads adapted to normally engage said internal threads, one of said members having longitudinal slits therein whereby said threaded portions may move out of threading engagement with each other at any one of a plurality of positions.

In testimony whereof I sign this specification.

HAROLD K. RADER.